United States Patent
Mani et al.

(10) Patent No.: US 7,844,757 B2
(45) Date of Patent: Nov. 30, 2010

(54) METHOD AND SYSTEM FOR PROVIDING MULTIPLE PATHS TO USER DATA STORED ON A SCSI DISK

(75) Inventors: Anbazhagan Mani, Bangalore (IN); Robert George Kovacs, Austin, TX (US); Chandan Chopra, Bangalore (IN); Vasu Vallabhanei, Austin, TX (US)

(73) Assignee: International Machines Business Corporation, Armonk, NY (US)

( * ) Notice: Subject to any disclaimer, the term of this patent is extended or adjusted under 35 U.S.C. 154(b) by 226 days.

(21) Appl. No.: 12/137,631

(22) Filed: Jun. 12, 2008

(65) Prior Publication Data

US 2009/0313401 A1    Dec. 17, 2009

(51) Int. Cl.
   *G06F 3/00*    (2006.01)
(52) U.S. Cl. .............................. 710/38; 710/36; 710/74
(58) Field of Classification Search ........................ None
   See application file for complete search history.

(56) References Cited

U.S. PATENT DOCUMENTS

| | | | |
|---|---|---|---|
| 6,138,187 | A | 10/2000 | Denning et al. |
| 6,542,934 | B1 * | 4/2003 | Bader et al. .................. 709/239 |
| 6,769,071 | B1 | 7/2004 | Cheng et al. |
| 6,954,881 | B1 | 10/2005 | Flynn, Jr. et al. |
| 7,039,827 | B2 | 5/2006 | Meyer et al. |
| 7,069,354 | B2 | 6/2006 | Pooni et al. |
| 7,130,868 | B2 * | 10/2006 | Ito et al. ........................... 1/1 |
| 2003/0200477 | A1 | 10/2003 | Ayres |
| 2005/0278465 | A1 | 12/2005 | Qi |
| 2006/0242156 | A1 * | 10/2006 | Bish et al. ..................... 707/10 |
| 2006/0277383 | A1 | 12/2006 | Hayden et al. |
| 2006/0285550 | A1 | 12/2006 | Do et al. |
| 2007/0028244 | A1 * | 2/2007 | Landis et al. ............... 718/108 |

OTHER PUBLICATIONS

Cwiakala, R. et al., Dynamic Channel Path Addition Process, May 5, 1993, IBM Technical Disclosure Bulletin, pp. 73-74.*
Configuring Multi-Path I/O for AIX client logical partitions; http://publib.boulder.ibm.com/infocenter/eserver/v1r3s/index.jsp?topic=/iphb1/iphb1_vios_mpio.htm; paragraph 1.
Design and implementation of an efficient multipath for a SAN environment, Jun Luo, Ji-uw Shu; Wei Xue Source: Parallel and Distributed Processing and Applications ISPA 2005 Workshops. ISPA 2005 International Workshops AEPP, ASTD, GCIC, IADS MASN, SGCA, and WISA. Proceeding, 2005, 101-10.
Design and Implementation of an RDP device driver for windows 2000, Tan, Yu-An; Cao, Yuan-Da Source: Journal of Beijing Institute of Technology, v 12, n 3, Sep. 2003, pp. 260-264.

* cited by examiner

*Primary Examiner*—Eron J Sorrell
(74) *Attorney, Agent, or Firm*—Yee & Associates, P.C.; David A Mims, Jr.; Rudolf O. Siegesmund

(57) ABSTRACT

A method and system for providing multiple input/output paths for accessing storage devices includes providing two or more logical paths between a virtual I/O client partition and a storage device and establishing a physical path between the virtual I/O client partition and the storage device by assigning the storage device to a first logical path of the two or more logical paths. The method further includes reestablishing the physical path by dynamically assigning the storage device to a second logical path of the two or more logical paths in an event of unavailability of the first logical path.

19 Claims, 3 Drawing Sheets

METHOD AND SYSTEM FOR PROVIDING MULTIPLE PATHS TO USER DATA STORED ON A SCSI DISK

FIELD OF THE INVENTION

The specification and claims generally relate to storage devices. In particular, the specification and claims relate to providing multiple redundant paths to access data stored on storage devices without requiring dedicated physical hardware for all such paths.

BACKGROUND OF THE INVENTION

Computer systems for large scale applications such as banking, insurance, and telephony are gaining popularity. These computer systems require a large amount of storage capacity for storing various types of critical data such as consumer details, billing records and so on. To provide data reliability and fault tolerance of the critical data, it is often necessary to implement data redundancy. One of the popular techniques to provide data redundancy implements multiple paths between a client and a storage device using a virtual input/output (I/O) environment.

Some of the currently available techniques for providing multiple paths between the client and the storage device enable simultaneous access to the storage device using a virtual I/O client partition through multiple virtual I/O server partitions. In such instances, the virtual I/O client partition may send a request to the storage device on all the virtual I/O server partitions. Upon receipt of such a request, one of the virtual I/O server partitions may respond and enable access to the storage device. However, these techniques require storage devices with multiple ports. Also, these techniques require redundant physical slots and physical storage device adapters for coupling the multiple-port storage device to the multiple virtual I/O server partitions. Hence, implementing these techniques is expensive. Furthermore, these techniques cannot be applied to storage devices that do not support simultaneous access from the multiple virtual I/O server partitions.

In other techniques for providing multiple paths between the client and the storage device, data is replicated or mirrored over multiple storage devices and each of the multiple storage devices is assigned to one of the multiple virtual I/O server partitions. The virtual I/O client partition then accesses these storage devices via the multiple virtual I/O server partitions. However, these techniques also need redundant physical storage devices and physical storage device adapters, thereby increasing the cost.

Therefore, there is a need in the art for a cost-effective technique for providing multiple paths for accessing the storage device that requires minimal physical resources.

BRIEF SUMMARY OF THE INVENTION

A method for providing multiple input/output paths for accessing storage devices is provided. The method includes providing two or more logical paths between a virtual I/O client partition and a storage device and establishing a physical path between the virtual I/O client partition and the storage device by assigning the storage device to a first logical path of the two or more logical paths. The method further includes reestablishing the physical path by dynamically assigning the storage device to a second logical path of the two or more logical paths in an event of unavailability of the first logical path.

A system for providing multiple input/output paths for accessing storage devices is provided. The system includes a virtual I/O client partition and two or more virtual I/O server partitions coupled to the virtual I/O client partition for providing two or more logical paths between the virtual I/O client partition and the storage device, wherein one virtual I/O server partition of the two or more virtual I/O server partitions corresponds to one logical path of the two or more logical paths. The system further includes a resource manager coupled to the two or more virtual I/O server partitions. The resource manager establishes a physical path between the virtual I/O client partition and the storage device by assigning the storage device to a first logical path of the two or more logical paths. The resource manager further reestablishes the physical path by dynamically assigning the storage device to a second logical path of the two or more logical paths in an event of unavailability of the first logical path.

A computer program product including computer readable medium including a computer usable program code for causing a computer to provide multiple input/output paths for accessing storage devices is provided. The computer usable program code causes the computer to provide two or more logical paths between a virtual I/O client partition and a storage device. The computer usable program code further causes the computer to establish a physical path between the virtual I/O client partition and the storage device by assigning the storage device to a first logical path of the two or more logical paths. The computer usable program code further causes the computer to reestablish the physical path by dynamically assigning the storage device to a second logical path of the two or more logical paths in an event of unavailability of the first logical path.

DETAILED DESCRIPTION

Figure 1:
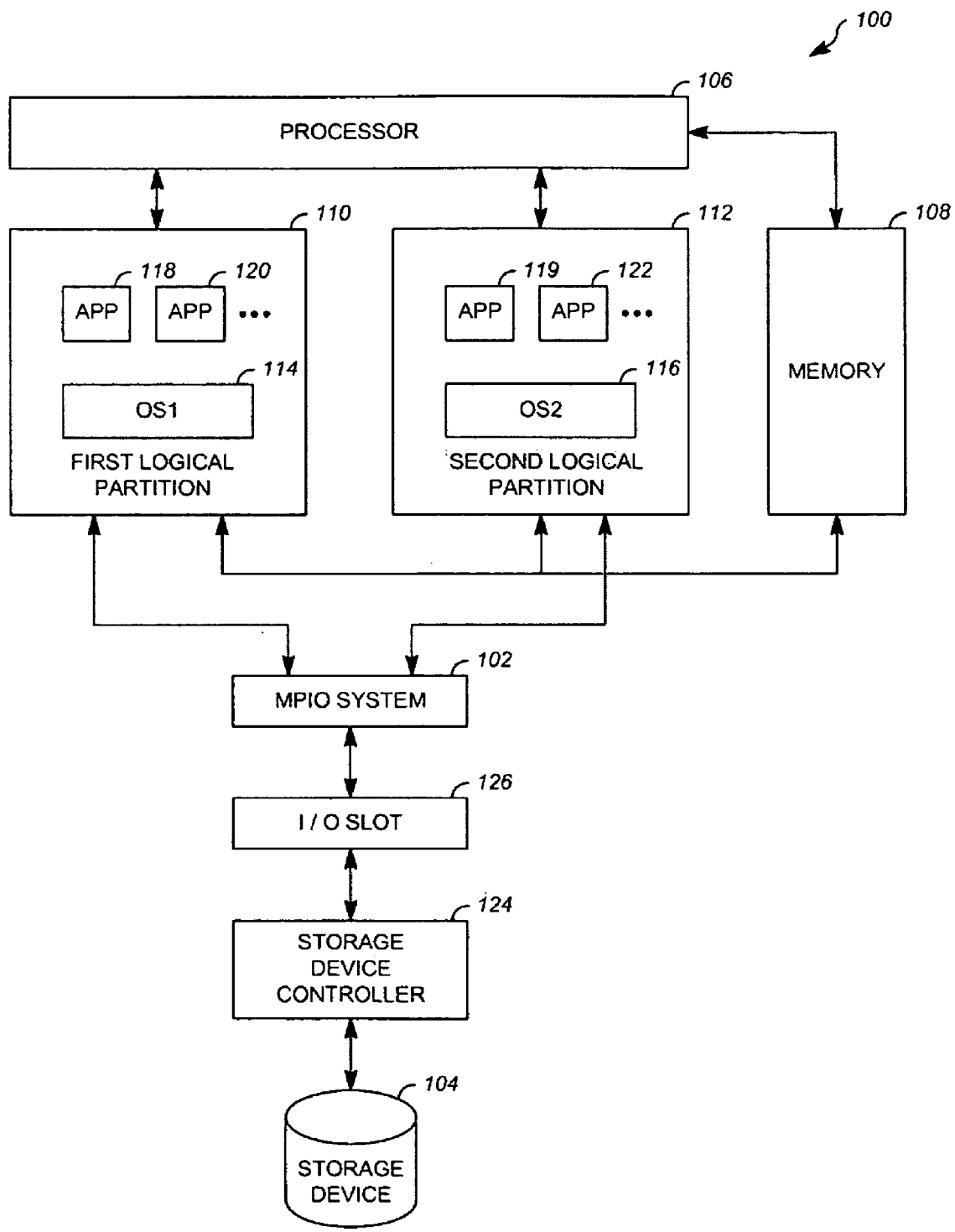
FIG. 1 illustrates a system for deploying a multi-path input/output (MPIO) system for accessing a storage device.

FIG. 1 illustrates an exemplary computing system 100 for deploying a multi-path input/output (MPIO) system 102 for accessing at least one storage device 104. Computing system 100 may be for example, a cluster, a server, or a stand-alone personal computer. Further by way of example, computing system 100 may be is eServer™ by IBM.

Computing system 100 includes one or more logical partitions such as first logical partition 110 and second logical partition 112 running on at least one processor 106. An operating system (OS) resides in each of the logical partitions. For example, first operating system (OS1) 114 resides in first logical partition 110 and second operating system (OS2) 116 resides in second logical partition 112. OS1 114 and OS2 116 may be the same or different. For example, OS1 114 and OS 2 116, without limitation, may be one of the following: Linux™, Windows™ by Microsoft, AIX™ by IBM, or i5/OS™ by IBM. First logical partition 110 and second logical partition 119 may include one or more applications, such as applications 118, 119, 120, and 122. The one or more applications may also reside in memory 108 and are executed by the at least one processor 106.

The one or more logical partitions access storage device 104 over at least one I/O slot 126. MPIO system 102 provides multiple input/output (I/O) paths for accessing storage device 104. A detailed explanation of an embodiment of MPIO system 102 comprising various components is given in conjunction with FIG. 2. Storage device 104 is, without limitation, a hard disk, a floppy disk, a compact disk (CD) drive, or a digital video disk (DVD) drive. Storage device 104 may be a small computer system interface (SCSI) compatible storage device. Alternatively, storage device 104 may be a storage area network (SAN) device or a network-attached storage (NAS) device. Computing system 100 further includes storage device controller 124 for controlling storage device 104. Storage device controller 124 is plugged into the at least one I/O slot 126.

Computing system 100 may further include various other components, not shown in FIG. 1, such as, without limitation, a keyboard, a mouse, a display device, an internet connection, and any other devices or connections known to persons skilled in the art.

Figure 2:
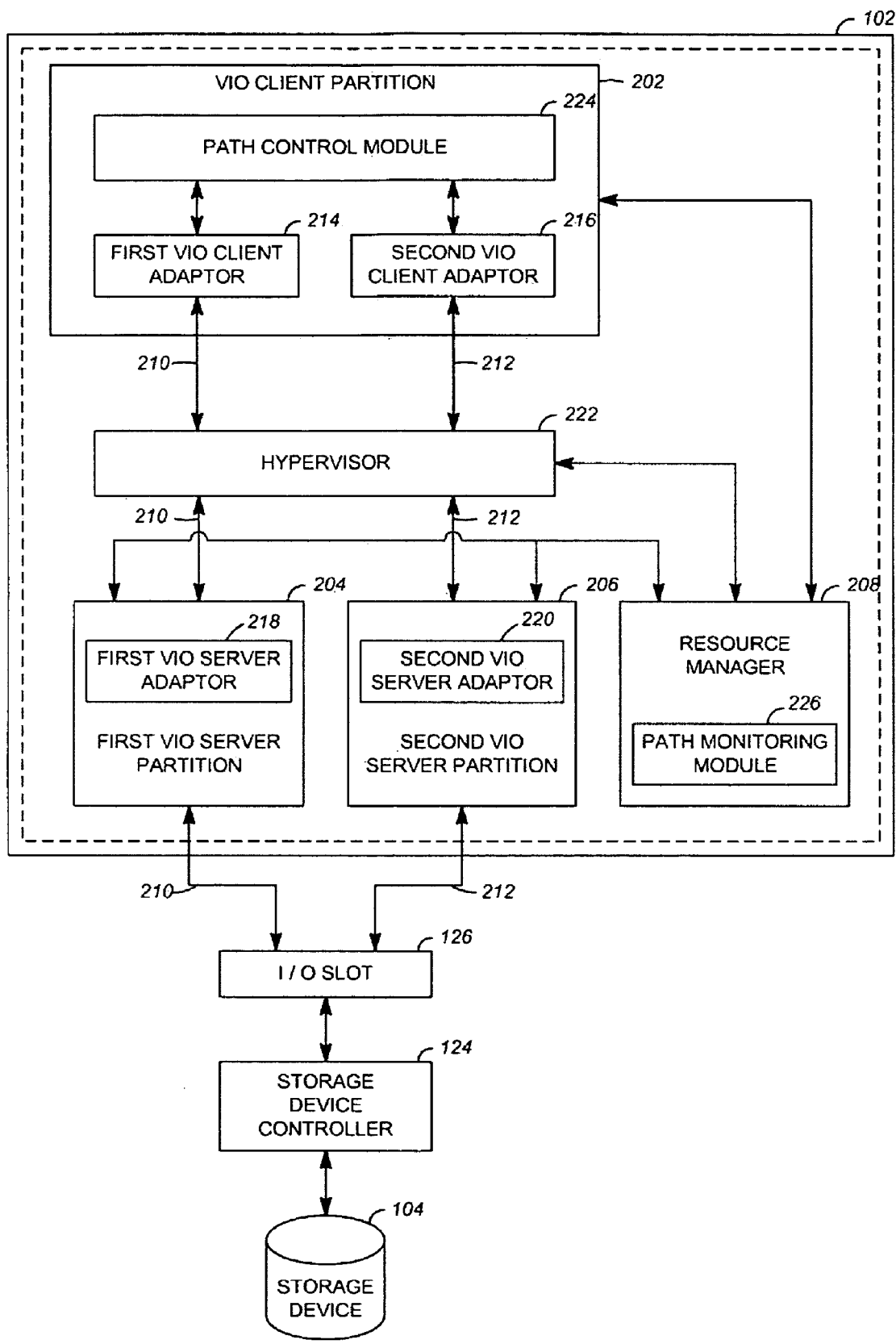
FIG. 2 is a schematic diagram illustrating the MPIO system.

FIG. 2 illustrates MPIO system 102 for providing multiple input/output (I/O) paths for accessing storage device 104. MPIO system 102 includes a virtual input/output (VIO) client partition 202, two or more virtual input/output (VIO) server partitions, such as first VIO server partition 204, second VIO server partition 206, and resource manager 208.

VIO client partition 202 is a logical partition that performs I/O operations with storage device 104. For example, VIO client partition 202 may be first logical partition 110 or second logical partition 112 of FIG. 1. VIO client partition 202 may access storage device 104 over first logical path 210 or second logical path 212 through first VIO server partition 204 and second VIO server partition 206, respectively.

The operating system may reside on VIO client partition 202. The operating system may be, for example, AIX™ 5L Version 5.3, SUSE LINUX Enterprise Server 9, Red Hat Enterprise Linux AS, Linux-ppc, or i5/OS™.

VIO client partition 202 includes first VIO client adapter 214 and second VIO client adapter 216. First VIO client adapter 214 or second VIO client adapter 216 may issue an I/O request to first VIO server partition 204 and second VIO server partition 206, respectively, for accessing data stored on storage device 104.

First VIO sever partition 204 and second VIO sever partition 206 are logical partitions (LPARs) that are coupled to I/O slot 126 for accessing storage device 104. First VIO server partition 204 includes first VIO server adapter 218 and second VIO server partition 206 includes second VIO server adapter 220. First VIO client adapter 214 is mapped to first VIO server adapter 218 to enable VIO client partition 202 access to storage device 104 over first logical path 210. Similarly, second VIO client adapter 216 is mapped to second VIO server adapter 220 to enable VIO client partition 202 access to storage device 104 over second logical path 212.

Resource manager 208 is coupled to VIO client partition 202, first VIO server partition 204, and second VIO server partition 206. Resource manager 208 assigns storage device 104 to first VIO server partition 204 by allotting I/O slot 126 holding storage device controller 124 of storage device 104 to first VIO server partition 204. Resource manager 208 then creates first logical path 210 between VIO client partition 202 and storage device 104 through first VIO server partition 204 by configuring first VIO server partition 204. Once first logical path 210 is established, whenever storage device 104 is detached from first VIO server partition 204, first logical path becomes a passive path. However, whenever storage device 104 is assigned to the first VIO server partition, the first logical path becomes an active path over which VIO client partition 202 can access storage device 104.

Resource manager 208 then assigns storage device 104 to second VIO server partition 206 by allotting I/O slot 126 holding storage device controller 124 of storage device 104 to second VIO server partition 206. Resource manager 208 then creates second logical path 212 between VIO client partition 202 and storage device 104 through second VIO server partition 206 by configuring second VIO server partition 206. Once second logical path 212 is established, whenever storage device 104 is detached from second VIO server partition 206, the second logical path becomes a passive path. However, whenever storage device 104 is assigned to the second VIO server partition, the second logical path becomes an active path over which VIO client partition 202 can access storage device 104.

Resource manager 208 may use dynamic logical partitioning (DLPAR) operations to dynamically assign storage device 104 from first VIO server partition 204 to second VIO server partition 206. In this case, resource manager 208 sends a request to first VIO server partition 204 over a network (not shown) to release storage device 104 and put storage device 104 into a quiescent state. Storage device 104 is then placed under control of hypervisor 222. Thereafter, resource manager 208 sends a command to hypervisor 222 to reassign storage device 104 from first VIO server partition 204 to second VIO server partition 206. Then, resource manager 208 sends a request to second VIO server partition 206 over the network to acquire storage device 104 from the hypervisor 222.

Resource manager 208 establishes a physical path between the VIO client partition 202 and storage device 104 by dynamically assigning storage device 104 to first VIO server partition 204 (that is, to first logical path 210) thus, enabling VIO client partition 202 to access storage device 104 over first logical path 210.

In an event of an unavailability of first logical path 210, resource manager 208 reestablishes the physical path by dynamically assigning the storage device to second VIO server partition 206 (that is, to second logical path 212), thus enabling VIO client partition 202 to access storage device 104 over second logical path 212. Further, path control module 224 increases a time-out interval of first VIO client adapter 214 upon the unavailability of first logical path 210. Path control module 224 may increase the time-out interval of first VIO client adapter 214 by at least an interval resource manager 208 takes for detaching storage device 104 from first VIO server partition 204 and assigning storage device 104 to second VIO server partition 206. This ensures that one or more applications (for example, the applications 116, 118) running on VIO client partition 202 accessing storage device 104 over first logical path 210 do not suffer or fail because of the unavailability of first logical path 210.

Unavailability of first logical path 210 may be triggered by a failure of first logical path 210. Alternatively, a predetermined "failure" may also be triggered by a scheduled maintenance of first logical path 210. Resource manager 208 includes path monitoring module 226 coupled with first VIO server partition 204 and second VIO server partition 206 for detecting the unavailability of first logical path 210.

A person skilled in the art will understand that there may not be any constraints posed on an order in which the two or more logical paths are created. Also, a person skilled in the art will recognize that the physical path may be established by assigning the storage device to any of the two or more logical paths (that is, assigning the storage device to the corresponding VIO server partition). Furthermore, the physical path may be reestablished by dynamically assigning the storage device to any one of remaining logical paths (that is, to the corresponding VIO server partitions) in the event of unavailability of the active path.

Resource manager 208 may also perform various other functions including, but without limitation, creating first VIO server partition 204 and second VIO server partition 206, creating first VIO server adapter 218 and second VIO server adapter 220, creating first VIO client adapter 214 and second VIO client adapter 216, mapping first VIO client adapter 214 to first VIO server adapter 218, and mapping second VIO client adapter 216 to second VIO server adapter 220 by sending corresponding commands to hypervisor 222.

Resource manager 208 is shown in FIG. 2 to reside physically close to the VIO client partition 202, the one or more VIO server partitions 204 and 206, and hypervisor 222. A person skilled in the art will recognize that resource manager 208 may reside at a location remote to VIO client partition 202 and the one or more VIO server partitions 204 and 206. In this case, resource manager 208 communicates with VIO client partition 202, the one or more VIO server partitions 204 and 206, and hypervisor 222 using a standard protocol such as the Internet Protocol.

Resource manager 208 may be a hardware management console (HMC). The HMC may be a Linux kernel installed on a 32-bit Intel-based desktop personal computer (PC). Using the HMC, a system administrator may manage the software configuration and operation of first VIO server partition 204 and second VIO server partition 206. The HMC may include a graphical user interface and the graphical user interface may be implemented as a Web-based graphical user interface. Alternatively, the HMC includes a command line interface that may be accessed locally, and the command line interface may also be accessed remotely through an encryption-protected secure shell (SSH).

The HMC may be coupled to first server partition 204 and second VIO server partitions 206, respectively, and VIO client partition 202 over a private network. In this case, the HMC is a dynamic host configuration protocol (DHCP) server. The private network may, for example, be a local area network (LAN). Alternatively, the HMC is coupled to first VIO server partition 204, second VIO server partition 206, and VIO client partition 202 over a public network, such as the Internet.

Resource manager 208 may be an integrated virtualization manager (IVM). The IVM may include a graphical user interface or a command line interface, and the IVM may be software installed on one of the VIO server partitions, such as first VIO server partition 204. Hypervisor 222 may be a software that runs directly on a given hardware platform such as Xen, VMware's ESX server, L4 microkernels, IBM's LPAR hypervisor, Microsoft's Hyper-V or Sun's Logical domains hypervisor. Alternatively, hypervisor 222 may be software that runs within an operating system environment, such as VMware Server, VMware Workstation, VMware Fusion, the open source QEMU, Microsoft's Virtual PC, Microsoft Virtual Server products, or InnoTek's VirtualBox. As used herein, Hypervisor means software used to enable the virtualization of system hardware into multiple, independent, logical partitions. It also allows for multiple operating systems to run simultaneously on a system."

Though only one VIO client partition has been shown in FIG. 2, a person skilled in the art will recognize that the present invention may be extended to more than one VIO client partition in a similar manner as described above. Similarly, a person skilled in the art will also recognize that MPIO system 102 may further include more than two VIO server partitions for providing corresponding logical paths between VIO client partition 202 and storage device 104.

Figure 3:
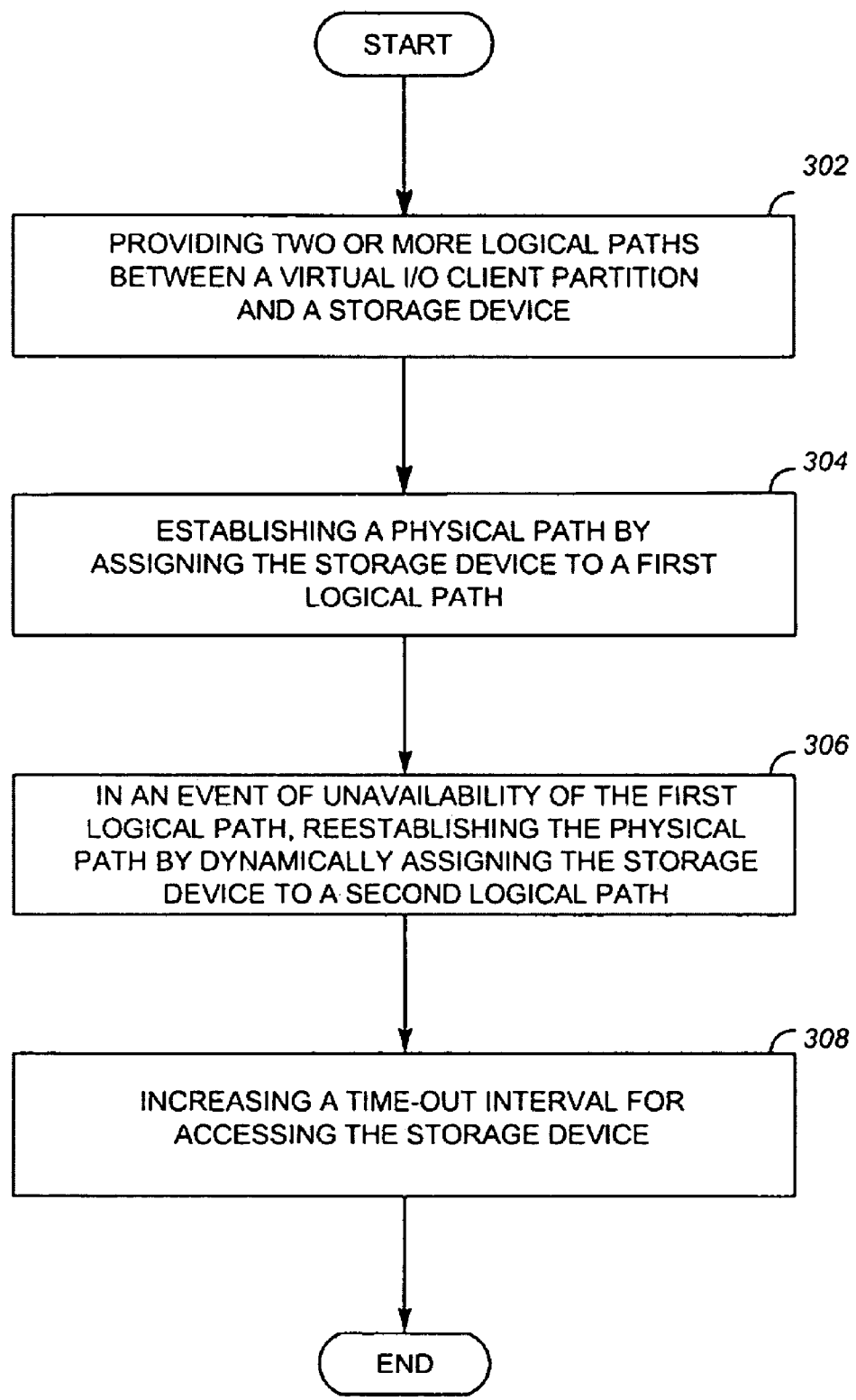
FIG. 3 is a flow chart illustrating a method for providing multiple input/output paths for accessing storage devices.

FIG. 3 is a flowchart illustrating a method for providing multiple input/output (I/O) paths for accessing storage devices in accordance with an embodiment of the present invention. At step 302, two or more logical paths, such as the logical paths 210 and 212, are provided between the VIO server partitions 204 and 206, respectively, and storage device 104. Resource manager 208 may provide the logical paths 210 and 212 using dynamic logical partitioning (DLPAR) operations. For example, to provide first logical path 210 between VIO client partition 202 and storage device 104, resource manager 208 creates first VIO server adapter 218 sending a command, such as chhwres -r virtualio -m mpiosystem -o a -p VIOS1 --rsubtype scsi -s 1-a "adaptertype=server", to first VIO server partition 204. This command creates a VIO server adapter, for example, first VIO server adapter 218 on first VIO server partition (VIOS1) 204. In a similar manner, resource manger 208 creates first VIO client adapter 214 on VIO client partition 202 (chhwres -r virtualio -m mpiosystem -o a -p VIOC1 --rsubtype scsi -s 1-a "adaptertype=client"). Thereafter, resource manager 208 maps first VIO client adapter 214 to first VIO server adapter 218 using a virtual slot number of first VIO server adapter 218. For example, resource manager 208 sends a command, such as chhwres -r virtualio -m mpiosystem -o s -p VIOC1--rsubtype scsi -a adapter type=client remote lpar name=VIOS1 remote slot num=<remote slot number at VIOS1>, to VIO client partition 202 for mapping first VIO client adapter 214 to first VIO server adapter 218.

Resource manager 208 then assigns storage device 104 to first VIO server adapter 218. Assigning storage device 104 to first VIO server adapter 218 includes allocating an I/O slot hosting storage device 104 to first VIO server adapter 218. Resource manager 208 allocates I/O slot hosting storage device 104, such as I/O slot 122, to first VIO server partition 204, using a command such as chhwres -r io -m mpiosystem -o a -p VIOS1 -l 2100. The parameter 2100 denotes a dynamic reconfiguration connector (DRC) index of I/O slot 122. Resource manager 208 then creates a virtual target device corresponding to storage device 104 on first VIO server partition 204 by issuing a command, for example, mkvdev -vdev hdisk1 -vadapter vhost1 -dev vhdisk1. In this instance, without loss of generality, storage device 104 is mapped as hdisk1 on first VIO server partition 204. Execution of the mkdev command also exports a logical unit number (LUN) of storage device 104, for example, 0x5463000000000000, to first VIO client adapter 214. When VIO client partition 202 is in a running state, resource manager 208 may further execute a configuration manager command (for example, cfgmgr command) to enable VIO client partition 202 to recognize the exported LUN. Thus, first logical path 210 is set between VIO client partition 202 and storage device 104. Further, resource manager 208 sets remaining logical paths in a similar manner. Though in the above mentioned description first logical path 210 is configured first, a person skilled in the art will recognize that there is no limitation on the order in which the two or more logical paths 210 and 212 are configured.

Thereafter, a physical path is established between VIO client partition 202 and storage device 104 by assigning storage device 104 to first logical path 210 at step 304. Resource manager 208 may assign storage device 104 to first logical path 210 using a command chhwres in a similar manner as described in conjunction with step 302. Thus, in this instance, first logical path 210 is an active path and second logical path 212 is a passive path. Consequently, VIO client partition 202 performs I/O operations with storage device 104 over first logical path 210 by sending one or more I/O requests to storage device 104. Alternatively, second logical path 212 may be activated initially instead of first logical path 210. In this case, second logical path 212 is the active path and VIO client partition 202 performs the I/O operations over second logical path 212.

In an event of an unavailability of first logical path 210, the physical path is reestablished at step 306 by dynamically assigning storage device 104 to second logical path 212 of the two or more logical paths. Resource manager 208 dynamically reassigns storage device 104 from the first VIO server partition 204 to second VIO server partition 206. For example, resource manager 208 may send a chhwres -r io -m mpiosystem -o m -p VIOS1-t VIOS2 -l 2100 command to hypervisor 222 to move I/O slot 122 from first VIO server partition (VIOS1) 204 to second VIO server partition (VIOS2) 206. Consequently, second logical path 212 becomes active. As second logical path 212 is already configured at step 302, VIO client partition 202 continues the I/O operations over second logical path 212.

Path monitoring module 226 detects unavailability of first logical path 210. The unavailability may, for example, be triggered by failure of first logical path 210. The path monitoring module may also check for the failure of first logical path 210 by monitoring response time by first VIO server partition 204 to the I/O requests. The failure of first logical path 210 may be triggered if the response time exceeds a predetermined waiting time stored in path monitoring module 226. The unavailability of first logical path 210 may also occur due to scheduled maintenance of first logical path 210.

When second logical path 212 is also unavailable, resource manager 208 may reestablish the physical path by assigning storage device 104 to one of the remaining logical paths of the two or more logical paths. Furthermore, if second logical path 212 becomes unavailable after activating second logical path 212, resource manager 208 may reestablish the physical path by assigning storage device 104 to either one of the remaining logical paths or to first logical path 210.

Furthermore, at step 308, the time-out interval at VIO client partition 202 is increased upon unavailability of first logical path 210. The time-out interval is increased by an amount at least equal to an interval needed for dynamic assignment of storage device 104 from first logical path 210 to second logical path 212. This is done to prevent an application sending the I/O request from giving an error while resource manager 208 dynamically assigns storage device 104 from first logical path 210 to second logical path 212. Path control module 224 maintains the time-out interval. Upon unavailability of first logical path 210, resource manger 208 may issue a request to path control module 224 for increasing the time-out interval.

Various commands issued by resource manger 208 may be issued manually by a system administrator on the graphical user interface of resource manger 208. The graphical user interface may be accessed locally or remotely through a web-based client. Alternatively, the system administrator may issue the commands manually by entering the commands on a command line interface of resource manager 208. Alternatively, the commands may be issued automatically from a script, for example a perl script, running on another computing system. In such an instance, the other computing system is coupled to resource manager 208 through either a remote execution (rexec) client or an open-source secure shell (OpenSSH) client.

Moreover, a person skilled in the art will recognize that though various embodiments described above are implemented by resource manager 208 using HMC-specific commands, other embodiments for implementing the method are also possible using an IVM and replacing HMC-specific commands by corresponding IVM-specific commands.

MPIO system 102 may take the form of an entirely hardware embodiment, an entirely software embodiment or an embodiment containing both hardware and software elements. When MPIO system 102 is implemented in software, the software may include, without limitation, firmware, resident software, microcode, and other suitable methods to encode instructions known to persons skilled in the art.

Furthermore, MPIO system 102 may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD.

In the aforesaid description, specific embodiments of MPIO system 210 have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of MPIO 210.

What is claimed is:

1. A method for providing multiple input/output paths for accessing storage devices, the method comprising:
    establishing a first logical path between a virtual input/output client partition and a storage device by assigning the storage device to a first virtual input/output server partition;
    detaching the storage device from the first virtual input/output server partition;
    establishing a second logical path between the virtual input/output client partition and the storage device by assigning the storage device to a second virtual input/output server partition; and
    in an event of unavailability of the second logical path, reestablishing the first logical path by dynamically re-assigning the storage device to the first virtual input/output server partition.

2. The method of claim 1 wherein providing each logical path comprises:
    creating a virtual input/output server partition;
    assigning the storage device to the virtual input/output server partition; and
    mapping the virtual I/O client partition to the virtual input/output server partition.

3. The method of claim 1 wherein assigning the storage device to the first logical path comprises assigning a storage device controller hosting the storage device to the first logical path.

4. The method of claim 1 wherein the unavailability of the first logical path is triggered by at least one of failure of the first logical path or a scheduled maintenance of the first logical path.

5. The method of claim 1 wherein reestablishing the physical path further comprises dynamically detaching the storage device from the first logical path.

6. The method of claim 1 wherein reestablishing the physical path further comprises increasing a time-out interval for accessing the storage device.

7. A method for providing multiple input/output paths for accessing storage devices, the method comprising:
   providing two or more logical paths between a virtual input/output client partition and a storage device;
   establishing a physical path between the virtual input/output client partition and the storage device by assigning the storage device to a first logical path of the two or more logical paths; and
   in an event of unavailability of the first logical path, reestablishing the physical path by dynamically assigning the storage device to a second logical path of the two or more logical paths, wherein reestablishing the physical path further comprises increasing a time-out interval for accessing the storage device.

8. The method of claim 7 wherein the storage device is a small computer system interface storage device.

9. A system for providing multiple input/output paths for accessing storage devices, the system comprising:
   a virtual input/output client partition;
   a first virtual input/output server partition coupled to the virtual input/output client partition;
   a second virtual input/output server partition coupled to the virtual input/output client partition; and
   a resource manager coupled to the two or more virtual input/output server partitions, wherein the resource manager establishes a first logical path between the virtual input/output client partition and the storage device by assigning the storage device to the first virtual input/output server partition, detaches the storage device from the first virtual input/output server partition, establishes a second logical path between the virtual input/output client partition and the storage device by assigning the storage device to the second virtual input/output server partition, and wherein, in an event of unavailability of the first logical path, the resource manager reestablishes the first logical path by dynamically re-assigning the storage device to the first virtual input/output server partition.

10. The system of claim 9 wherein the storage device is a small computer system interface (SCSI) storage device.

11. The system of claim 9 wherein the unavailability of the first logical path is triggered by at least one of failure of the first logical path or a scheduled maintenance of the first logical path.

12. The system of claim 9 wherein the resource manager is a hardware management console (HMC).

13. The system of claim 9 wherein the resource manager comprises a path monitoring module coupled to the two or more virtual input/output server partitions for detecting unavailability of the first logical path.

14. The system of claim 9 further comprising a path control module for increasing a time-out interval for accessing the storage device upon the unavailability of the first logical path.

15. A computer program product comprising a computer usable medium including a computer usable program code for causing a computer to:
   establish a first logical path between a virtual input/output client partition and a storage device by assigning the storage device to a first virtual input/output server partition
   detach the storage device from the first virtual input/output server partition;
   establish a second logical path between the virtual input/output client partition and the storage device by assigning the storage device to a second virtual input/output server partition; and
   in an event of unavailability of the second logical path, reestablish the first logical path by dynamically re-assigning the storage device to the first virtual input/output server partition.

16. The computer program product of claim 15 wherein the computer usable program code causes the computer to:
   create a virtual input/output server partition;
   assign the storage device to the virtual input/output server partition; and
   map the virtual input/output client partition to the virtual input/output server partition.

17. The computer program product of claim 15 wherein the computer usable program code causes the computer to assign a storage device controller hosting the storage device to the first logical path.

18. The computer program product of claim 15 wherein the computer usable program code causes the computer to dynamically detach the storage device from the first logical path.

19. The computer program product of claim 15 wherein the computer usable program code causes the computer to increase a time-out interval for accessing the storage device.

* * * * *